(12) United States Patent
Mizuta et al.

(10) Patent No.: US 9,577,238 B2
(45) Date of Patent: Feb. 21, 2017

(54) FLAT-SHAPED BATTERY

(71) Applicant: PANASONIC CORPORATION, Osaka (JP)

(72) Inventors: Touta Mizuta, Osaka (JP); Daisuke Sumimoto, Osaka (JP); Yukihiro Gotanda, Osaka (JP); Shinichi Kawaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/440,747

(22) PCT Filed: Oct. 29, 2013

(86) PCT No.: PCT/JP2013/006405
§ 371 (c)(1),
(2) Date: May 5, 2015

(87) PCT Pub. No.: WO2014/076894
PCT Pub. Date: May 22, 2014

(65) Prior Publication Data
US 2015/0295218 A1    Oct. 15, 2015

(30) Foreign Application Priority Data
Nov. 19, 2012 (JP) .................. 2012-253450

(51) Int. Cl.
*H01M 2/02* (2006.01)
*H01M 2/04* (2006.01)
(Continued)

(52) U.S. Cl.
CPC .............. *H01M 2/26* (2013.01); *H01M 2/028* (2013.01); *H01M 2/0222* (2013.01);
(Continued)

(58) Field of Classification Search
CPC .... H01M 2/26; H01M 2/0222; H01M 2/1673; H01M 2/028; H01M 2/0408; H01M 2/30; H01M 6/16
See application file for complete search history.

(56) References Cited

FOREIGN PATENT DOCUMENTS

JP    54-75913 U    5/1979
JP    54-75913 U    2/1985
(Continued)

OTHER PUBLICATIONS

Extended European Search Report issued in European Application No. 13854978.7 dated Oct. 8, 2015.
(Continued)

*Primary Examiner* — Muhammad Siddiquee
(74) *Attorney, Agent, or Firm* — McDermott Will & Emery LLP (57) ABSTRACT

Disclosed is a flat-shaped battery including: a power generation element including a positive electrode, a negative electrode, a separator, and an electrolyte; a cylindrical case formed of a conductor, housing the power generation element, and having a circular bottom and a circular opening; a sealing plate formed of a conductor and closing the opening; an insulating member interposed between the case and the sealing plate; and a plate-shaped current collector disposed between the case and the positive electrode. The current collector is welded to the case and is in contact with the positive electrode. A welding point where the current collector is welded to the bottom is set so as to allow contact between the positive electrode and a center portion of the current collector to be maintained when the case is deformed such that a center portion of the bottom is displaced outward of the case.

7 Claims, 4 Drawing Sheets (51) Int. Cl.
   *H01M 2/26* (2006.01)
   *H01M 2/30* (2006.01)
   *H01M 2/16* (2006.01)
   *H01M 6/16* (2006.01)
(52) U.S. Cl.
   CPC ....... *H01M 2/0408* (2013.01); *H01M 2/1673* (2013.01); *H01M 2/30* (2013.01); *H01M 6/16* (2013.01)

(56) References Cited

FOREIGN PATENT DOCUMENTS

| | | |
|---|---|---|
| JP | 60-17565 U | 2/1985 |
| JP | 61-133571 A | 6/1986 |
| JP | 03-266362 A | 11/1991 |
| JP | 04-026051 A | 1/1992 |
| JP | 04-066767 U | 6/1992 |
| JP | 06-007493 B2 | 1/1994 |
| JP | 2545183 Y2 | 8/1997 |
| JP | 2003-317731 A | 11/2003 |
| JP | 2008-186711 A | 8/2008 |
| JP | 2010-205701 A | 9/2010 |
| JP | 2010-212208 A | 9/2010 |

OTHER PUBLICATIONS

International Search Report issued in PCT/JP2013/006405, dated Dec. 3, 2013.
International Search Report issued in PCT/JP2013/006405, dated Dec. 3, 2013, with English translation.
Chinese Office Action with partial English Translation issued in Chinese Application No. 201380057150.X, mailed Aug. 22, 2016.

FLAT-SHAPED BATTERY

RELATED APPLICATIONS

This application is the U.S. National Phase under 35 U.S.C. §371 of International Application No. PCT/JP2013/006405, filed on Oct. 29, 2013, which in turn claims the benefit of Japanese Application No. 2012-253450, filed on Nov. 19, 2012, the disclosures of which Applications are incorporated by reference herein.

TECHNICAL FIELD

The present invention relates to a flat-shaped battery, specifically to an improvement of the discharge characteristics thereof.

BACKGROUND ART

Flat-shaped batteries, small in size and thickness, are widely used as power source for devices whose miniaturization is desired, such as watches and remote controllers for automotive keyless entry system. They are also widely used as power source for applications where long-term continuous supply of electric power is required, such as memory backup for office automation (OA) or factory automation (FA) equipment. They are also used as power source for various meters and measurement apparatus, and their applications are expanding. In recent years, there is a growing demand for them to be used in severe environments, for example, in automobiles parked outdoors in cold districts or under the hot summer sun, or industrial machines used in high temperature environments, and improvement is underway for their higher performance.

Flat-shaped batteries include a flat case serving as a positive terminal. Positive and negative electrodes and a separator interposed therebetween are housed in the case, and an electrolyte is poured into the case. The opening of the case is closed with a sealing plate serving as a negative terminal, with a gasket interposed therebetween. The positive electrode is, for example, a circular plate-shaped pellet of a positive electrode material mixture including an active material such as manganese dioxide or fluorinated graphite. The positive electrode pellet is housed in the case such that one bottom surface thereof faces the bottom of the case.

To improve the current collecting ability of the positive electrode, a plate-shaped current collector is disposed between the positive electrode pellet and the bottom of the case. The current collector, at one side thereof, is in contact with the positive electrode pellet, and at the other side thereof, for example, is spot-welded to a center portion of the bottom of the case, providing electrical connection between the positive electrode pellet and the case.

Disadvantageously, the battery internal pressure increases when the battery is placed in high temperatures or other extreme conditions. The increase in battery internal pressure may cause the case to "swell" such that the bottom of the case bulges outward. If the case swells as above, the current collector may deform as well to follow the deformation of the case, and the contact pressure between the positive electrode pellet and the current collector may drop. As a result, the internal resistance of the battery increases, and the discharge characteristics of the battery degrade.

To solve the above problem, Patent Literature 1 discloses forming a plate-shaped current collector such that the cross section at its center is U-shaped. This can impart a spring function to the current collector, and thus can improve the contact between the positive electrode and the current collector.

CITATION LIST

Patent Literature

[PTL 1] Japanese Examined Patent Publication No. Hei 6-7493

SUMMARY OF INVENTION

Technical Problem

Even though the current corrector has a spring function as above, if the spring function is not sufficient enough, the above good contact may not be ensured when the case "swells" severely. To avoid this, a sufficiently high spring function needs to be imparted to the current collector. If, as a result, the elastic force exerted by the current collector becomes too strong, large force will be applied to both ends of the positive electrode pellet, which may cause cracks or breaks. Cracks or breaks in the positive electrode pellet, if any, make it difficult to maintain the battery characteristics over a long period of time.

Solution to Problem

The present invention relates to a flat-shaped battery including:
a power generation element including a positive electrode, a negative electrode, a separator, and an electrolyte;
a cylindrical case formed of a conductor and housing the power generation element, the case having a circular bottom and a circular opening;
a sealing plate formed of a conductor and closing the opening;
an insulating member interposed between the case and the sealing plate; and
a plate-shaped current collector disposed between the case and the positive electrode, the current collector being welded to the case and in contact with the positive electrode.

A welding point where the current collector is welded to the bottom is set so as to allow contact between the positive electrode and a center portion of the current collector to be maintained when the case is deformed such that a center portion of the bottom is displaced outward of the case.

Advantageous Effects of Invention

According to the present invention, it is possible to suppress the decrease in the contact pressure between the current collector and the positive electrode even when the bottom of the case bulges outward, without applying a large elastic force to the positive electrode from, for example, the current collector. Therefore, the discharge characteristics of the battery can be improved, and the battery characteristics can be maintained over a long period of time.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

The present invention relates to a flat-shaped battery including: a power generation element including a positive electrode, a negative electrode, a separator, and an electrolyte; a cylindrical case formed of a conductor and housing the power generation element, the case having a circular bottom and a circular opening; a sealing plate formed of a conductor and closing the opening; an insulating member interposed between the case and the sealing plate; and a plate-shaped current collector disposed between the case and the positive electrode. The current collector is welded to the case and is in contact with the positive electrode.

In the present invention, a welding point where the current collector is welded to the bottom of the case is set so as to allow contact between the positive electrode and a center portion of the current collector to be maintained, or so as to create a space between the current collector and the center portion of the bottom, when the case is deformed such that the center portion of the bottom is displaced outward of the case, that is, when the center portion of the bottom of the case bulges outward.

According to the present invention, since the welding point is set in an outside region AR2 of the bottom (see FIG. 5), the current collector can be kept straight and flat without following the deformation of the case, even when the center portion of the bottom bulges outward due to, for example, an increase in the case internal pressure. This allows the current collector and the positive electrode to be kept in good contact with each other, and creates a space (GA1) between the current collector and the center portion of the bottom, or enlarges the space as originally existing therebetween. Therefore, even when the center portion of the case bottom bulges outward due to, for example, an increase in the case internal pressure, the decrease in the contact pressure between the current collector and the positive electrode and between the positive electrode and the negative electrode can be prevented.

As a result, even though the battery size is small, regardless of the size and without applying a large elastic force from the current collector to the positive electrode in advance, the contact pressure between the current collector and the positive electrode can be favorably maintained. Thus the deterioration in battery discharge characteristics attributed to swelling of the battery case can be prevented.

Furthermore, there is no necessity of consistently applying to the positive electrode a large elastic force for maintaining the above contact pressure. Thus the battery characteristics can be easily maintained over a long period of time.

Figure 2:
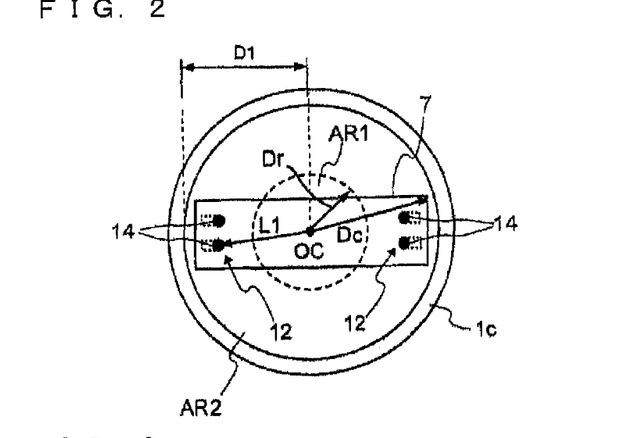
FIG. 2 A schematic top view of a battery case with a current collector attached to a bottom of the case.

Here, a center portion AR1 of the bottom can be defined as a region within a circle having a radius Dr, with the center at an axial center OC of the bottom (see FIG. 2). When the radius of the bottom is denoted as D1, a ratio Dr/D1 is preferably less than 0.45. To be specific, the center portion of the bottom can be defined as a region where the distance from the axial center of the bottom is 0% or more and less than 45% of the radius of the bottom. The welding point is preferably set in a region (outside region AR2) between the above circle with the radius Dr and an outer peripheral circle (circle with the radius D1) of the bottom. Here, the outside region includes points on the circumference of the circle with the radius Dr and points on the circumference of the outer peripheral circle of the bottom (region encircled by the inner peripheral surface of a side wall 1c). In short, the welding point is preferably set in the outside region where the distance from the axial center of the bottom is 45% or more and 100% or less of the radius of the bottom. When the distance between the welding point and the axial center of the bottom is denoted as L1, a ratio L1/D1 is 0.45 or more and 1 or less. Moreover, the welding point preferably comprises two or more welding points which are set in the outside region. By configuring as above, regardless of the battery size, the deformation of the current collector can be suppressed when the bottom of the case bulges outward, and the decrease in the contact pressure between the current collector and the positive electrode can be prevented. Thus favorable discharge characteristics can be maintained.

Figure 3:
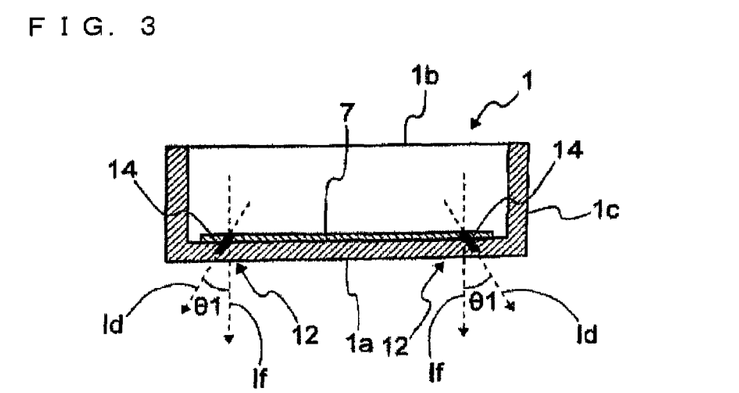
FIG. 3 A cross-sectional view of a case similar to that of FIG. 2.

In one embodiment of the present invention, the battery, in a fabricated state, has a welded portion formed such that a welding mark or thermally influenced area at the welded portion between the current collector and the bottom of the case extends from an inner surface to an outer surface of the bottom, with an axial direction Id of the welding mark inclined with respect to a thickness direction If of the bottom toward radially outside of the bottom (see FIG. 3). The inclination (θ1) can be set to, for example, 0.5 to 10°. By configuring as above, it is possible to effectively prevent the decrease in the contact pressure between the current collector and the positive electrode, and improve the battery discharge characteristics more reliably. To obtain such an inclination of the welding mark, the current collector is preferably welded to a case in which, under natural conditions (at ordinary temperatures and pressures), the center portion of the bottom is curved toward its interior (see FIG. 4). At this time, a ratio H1/D1 of a lifted amount H1 of the case bottom measured at its center to the radius D1 of the case is preferably 0.001 to 0.02.

Figure 7:
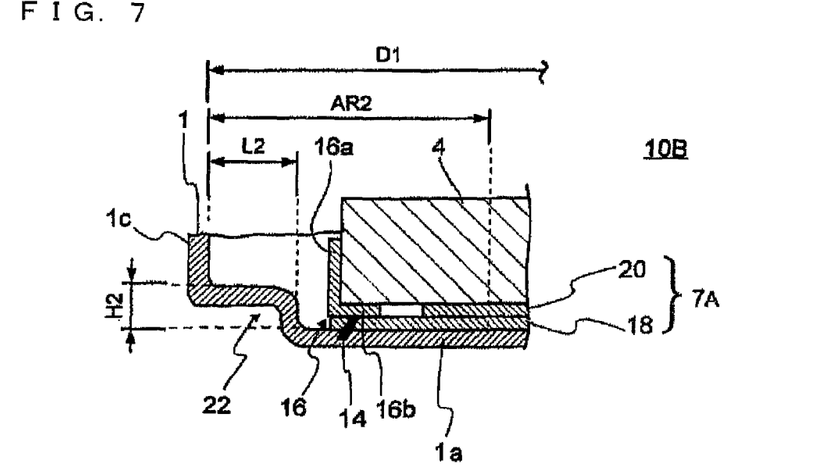
FIG. 7 A schematic cross-sectional view of an essential part of a modified example of the flat-shaped battery of FIG. 6.
Figure 8:
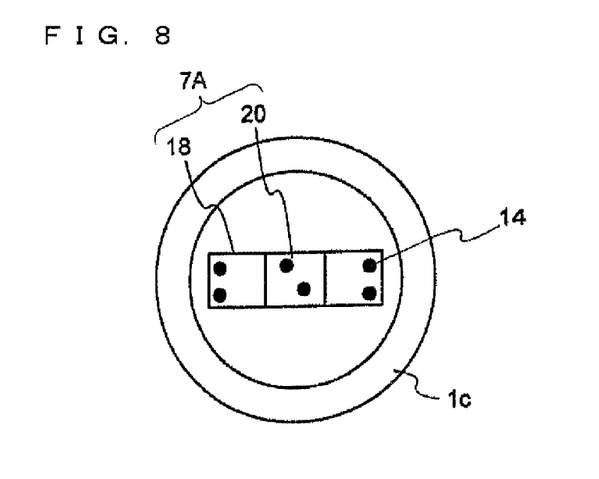
FIG. 8 A top view of a case of the flat-shaped battery of FIG. 7.

In another embodiment of the present invention, the current collector includes a protrusion protruding toward the positive electrode (see FIGS. 7 and 8). Such a protrusion can be formed on a current collector 7 by, for example, composing the current collector 7 of a primary current collector 18 and a secondary current collector 20 smaller in size than the primary current collector 18. The primary current collector 18 is welded to the case. The secondary current collector 20 is disposed between the primary current collector 18 and the positive electrode 4, and welded to the primary current collector 18. In this configuration, the secondary current collector 20 constitutes the protrusion.

This can more easily make the current collector and the positive electrode kept in good contact with each other, and more reliably improve the battery discharge characteristics.

Figure 6:
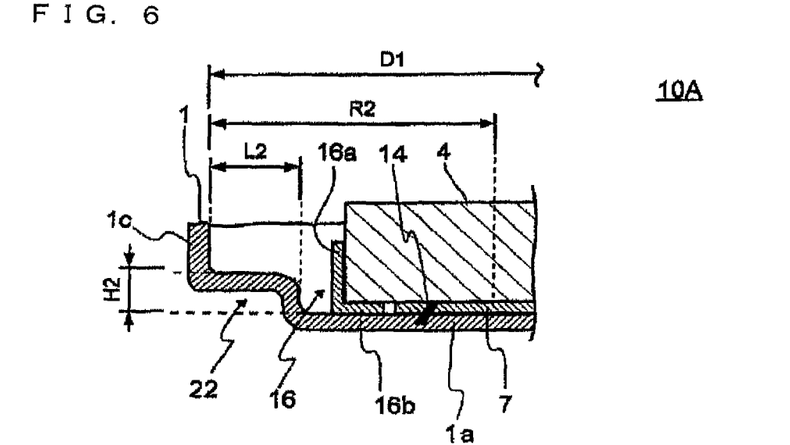
FIG. 6 A schematic cross-sectional view of an essential part of a flat-shaped battery according to another embodiment of the present invention.

In yet another embodiment of the present invention, a ring-shaped restricting member formed of a conductor is used (see FIGS. 6 and 7). The restricting member serves to restrict radial expansion of the positive electrode. Such a restricting member 16 facilitates the expansion of the positive electrode including, for example, $MnO_2$, in the thickness direction or axial direction thereof, and thereby can stabilize the battery discharge characteristics.

By adjusting the size of the restricting member and the current collector such that the restricting member 16 and the current collector 7 (7A) contact with each other in the outside region AR2 of a case bottom 1a (see FIG. 7), the welding point can be easily set in a more radially outside region of the case, and the current collector can be less influenced by the displacement of the center portion of the case bottom. By providing the current collector with the protrusion as above having a thickness corresponding to the thickness of the restricting member 16, the contact pressure between the positive electrode and the current collector can be favorably maintained. As a result, the discharge characteristics can be improved.

The shape of the current collector is not particularly limited, and can be a rectangle, square, circle, oval, or any other shape. The center of the current collector preferably overlaps the center of the case bottom. The current collector can be formed of various conductive materials such as stainless steel and a titanium alloy.

The size of the current collector is not particularly limited as long as the length of the long side of the current collector when it is rectangular, the diameter when it is circular, or the long diameter when it is oval (hereinafter collectively referred to as "size of the current collector") is larger than the diameter of the center portion AR1. More specifically, when the current collector is disposed such that the center thereof overlaps the axial center of the bottom, a ratio Dc/D1 of a distance Dc from the center to the edge of the current collector to the radius D1 of the bottom is preferably 0.65 to 0.90. A ratio L1/Dc of a distance L1 from the axial center of the bottom to the welding point to Dc is preferably 0.60 to 0.95, and more preferably 0.70 to 0.95.

The present invention will now be described with reference to drawings. A flat-shaped battery according to one embodiment of the present invention is schematically illustrated in cross section in FIG. 1.

Embodiment 1

Figure 1:
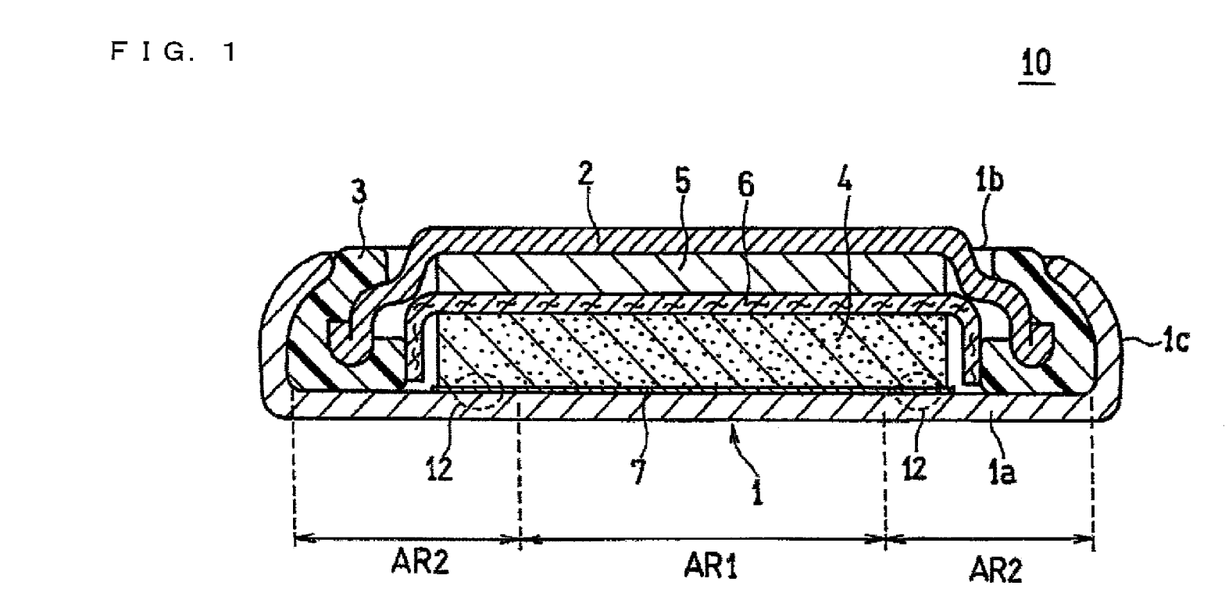
FIG. 1 A schematic cross-sectional view of a flat-shaped battery according to one embodiment of the present invention.

A flat-shaped battery (hereinafter simply referred to as "battery") 10 of the illustrated example includes a cylindrical case 1 formed of a conductive material and having a circular bottom 1a, a circular opening 1b, and a side wall 1c. The case 1 can be formed of, for example, stainless steel. The case 1 includes, in its interior, circular plate-shaped positive electrode 4 and negative electrode 5. A separator 6 is disposed between the positive electrode 4 and the negative electrode 5.

One bottom surface of the positive electrode 4 faces the bottom 1a of the case 1, and between the bottom surface and the bottom 1a of the case 1, a plate-shaped current collector 7 is disposed. One side of the current collector 7 is in contact with the bottom 1a of the case 1, and welded to the bottom 1a at a predetermined point. The other side of the current collector 7 is in contact with the aforementioned one bottom surface of the positive electrode 4. In that way, the positive electrode 4 is electrically connected to the case 1 via the current collector 7, allowing the case 1 to function as a positive external terminal of the battery 10.

The opening 1b of the case 1 is closed with a sealing plate 2 formed of a conductive material. The sealing plate 2 can be formed of, for example, stainless steel. A gasket (electrically insulating member) 3 is disposed between the peripheral portion of the sealing plate 2 and the opening 1b of the case 1. The opening 1b of the case 1 is crimped inward, thereby to secure the sealing plate 2 in position at the opening 1b of the case 1. The inner surface of the sealing plate 2 is in contact with the negative electrode 5. In that way, the sealing plate 2 is electrically connected to the negative electrode 5, allowing the sealing plate 2 to function as a negative external terminal of the battery 10.

The current collector 7 is not welded to the case 1 within the center portion AR1 of the bottom 1a of the case 1, and has a welded portion 12 with the case 1 within the doughnut-shaped outside region AR2 surrounding the center portion AR1. The welded portion 12 is preferably formed at point-symmetric positions with respect to the axial center of the bottom 1a within the outside region AR2, one or more portions at each position. The welded portion 12 may be formed coaxially within the outside region AR2. The outside region AR2 can be defined as a region where the distance from the axial center of the bottom 1a is 45% or more and 100% or less, preferably, 60% or more and 100% or less, of the inner radius D1 of the bottom 1a (see FIG. 2). Correspondingly, the center portion AR1 can be defined as a region where the distance from the axial center of the bottom 1a is 0% or more and less than 45% of the radius D1 of the bottom 1a, or 0% or more and less than 60%.

FIGS. 2 and 3 are schematic enlarged views of the welded portions between the current collector and the case. The current collector 7 in the figures has a long and narrow rectangular shape, but is not limited thereto. The current collector 7 may be rectangular, square, circular, oval, or any other shape.

The welded portion 12 can be formed by, for example, spot welding. The axial direction Id of a welding mark (or thermally influenced area) 14 of the welded portion 12 is inclined by an angle $\theta 1$ with respect to the thickness direction If of the bottom 1a toward radially outside of the bottom 1a. The angle $\theta 1$ may be, for example, 0.5 to 10°. The method of forming the welded portion 12 is not limited to spot welding, and may be seam welding or any other method. The shape of the welding mark 14 is not limited to a dot as shown in FIG. 2, and may be a line or any other shape.

Figure 4:
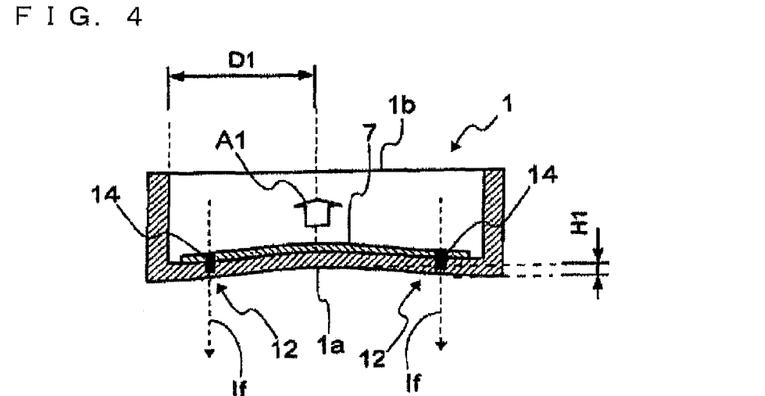
FIG. 4 A cross-sectional view of the case to schematically illustrate how the current collector is attached to the bottom of the case.

The method of forming the welding mark 14 with the axial direction Id thereof inclined with respect to the thickness direction If of the bottom 1a as above will be described below. First, as illustrated in FIG. 4, the case 1 with the bottom 1a curved so as to protrude toward the interior (in the direction indicated by an arrow A1) under natural conditions is prepared. The current collector 7 is placed on the bottom 1a, and welding is applied to form the welded portion 12. The curve of the bottom 1a is then flattened by, for example, placing the positive electrode 4 and other components in the case, and closing the opening 1b of the case 1 with the sealing plate 2. In that way, the welding mark 14 whose axis direction Id is inclined as shown in FIG. 3 can be obtained. The ratio H1/D1 of the lifted amount H1 of the case bottom measured at its center to the radius D1 of the case under natural conditions is preferably 0.001 to 0.02. This makes it easy to realize the above preferable range of the angle $\theta 1$.

Figure 5:
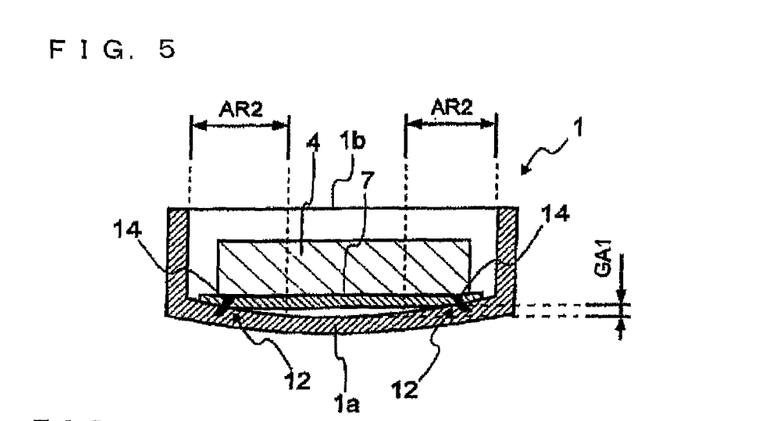
FIG. 5 A cross-sectional view to illustrate the current collector when the bottom of the case bulges outward.

FIG. 5 is a cross-sectional view to illustrate the current collector when the case bottom bulges outward. As illustrated in the figure, even when the bottom 1a bulges outward, the positive electrode 4 and the current collector 7 are kept in good contact with each other, and a space GA1 is created between the center portion of the bottom 1a and the current collector 7, because the current collector 7 is welded to the bottom 1a within the outside region AR2 of the bottom 1a. In that way, even when the bottom 1a bulges outward, the decrease in contact pressure between the positive electrode 4 and the current collector 7 can be suppressed, and the discharge characteristics of the battery 10 can be maintained favorably.

The following describes an exemplary structure of the battery 10. The positive electrode 4 can be produced by mixing $MnO_2$ serving as an active material with a conductive material, a binder, and other materials, if necessary, and compacting the positive electrode material mixture into a disc or flat plate shape, depending on the shape of the positive electrode 4. Fluorinated graphite or other materials may be used in place of $MnO_2$, as the positive electrode active material.

The conductive material may be any conductive material known in the art. Examples thereof include: graphites; carbon blacks, such as acetylene black, Ketjen black, channel black, furnace black, lamp black, and thermal black; carbon fibers; and various metal fibers. These may be used singly or in combination of two or more.

The binder may be any binder known in the art. Examples thereof include polyethylene, polypropylene, polytetrafluoroethylene (PTFE), polyvinylidene fluoride, tetrafluoroethylene-hexafluoropropylene copolymer, and vinylidene fluoride-hexafluoropropylene copolymer. These may be used singly or in combination of two or more.

The negative electrode 5 is formed of a material that releases lithium ion during discharge. Examples thereof include, but not limited to, metal lithium and a lithium alloy. These may be used singly or in combination of two or more.

The negative electrode 5 can be produced by forming a hoop of metal lithium or lithium alloy, into a disc or flat plate shape, depending on the shape of the negative electrode 5.

The separator 6 may be produced from any material known in the art. Examples thereof include non-woven fabric and microporous film made of a resin. These materials are, for example, punched in a circle. Examples of the material constituting the separator 6 include polyphenylene sulfide (PPS), polyethylene, polypropylene, a mixture of polyethylene and polypropylene, and a copolymer of ethylene and propylene.

The electrolyte (non-aqueous electrolyte) contains a solvent and a solute (lithium salt) and has lithium ion conductivity. The non-aqueous electrolyte is impregnated into the positive electrode 4 and the separator 6.

Examples of the solvent of the non-aqueous electrolyte include: chain carbonic acid esters, such as dimethyl carbonate (DMC), diethyl carbonate (DEC), and ethyl methyl carbonate (EMC); cyclic carbonic acid esters, such as ethylene carbonate (EC), propylene carbonate (PC), and butylene carbonate; chain ethers, such as 1,2-dimethoxyethane (DME), 1,2-diethoxy ethane (DEC), and ethoxy methoxy ethane (EMC); cyclic ethers, such as tetrahydrofuran, 2-methyltetrahydrofuran, 1,3-dioxolane, and 4-methyl-1,3-dioxolane; and cyclic carboxylic acid esters, such as γ-butyrolactone. These may be used singly or in combination of two or more.

The solvent of the non-aqueous electrolyte is, for example, a mixed solvent of PC and DME. The mixing ratio by volume of PC to DME is preferably 20:80 to 80:20, and more preferably 40:60 to 60:40.

When the solvent of the non-aqueous electrolyte includes PC and DME, the ratio of the total of PC and DME to the whole non-aqueous electrolyte is, but not limited to, preferably 40 to 98 wt %, and more preferably 70 to 97 wt %.

Examples of the solute (lithium salt) contained in the non-aqueous electrolyte include: $LiClO_4$, $LiPF_6$, $LiBF_4$, $LiR^1SO_3$, where $R^1$ represents a fluorinated alkyl group having a carbon number of 1 to 4, and $LiN(SO_2R^2)(SO_2R^3)$, where $R^2$ and $R^3$ represent the same or different fluorinated alkyl groups having a carbon number of 1 to 4. These lithium salts may be used singly or in combination of two or more.

The concentration of the lithium salt in the non-aqueous electrolyte is 0.2 to 2.0 mol/L, preferably 0.3 to 1.5 mol/L, and more preferably 0.4 to 1.2 mol/L.

Embodiment 2

Next, another embodiment of the present invention is described. A flat-shaped battery according to Embodiment 2 is partially illustrated in cross section in FIG. 6. A battery 10A of this embodiment differs from the battery 10 of Embodiment 1 in that a ring-shaped restricting member 16 is attached to the positive electrode 4. The bottom 1a of the case 1 is provided with a step 22. Likewise in Embodiment 1, the radius D1 of the bottom 1a corresponds to the distance from the axial center of the bottom 1a to the inner peripheral surface of the side wall 1c of the case 1. The step 22 provided on the bottom 1a can suppress the deformation of the peripheral portion of the sealing plate 2, and thereby improve the leakage resistance in high temperature environments. A distance L2 from the outer periphery of the bottom (inner peripheral surface of the side wall 1c) to the step is preferably 1.5 mm or more and 2.5 mm or less, and a height H2 of the step 22 is preferably 0.5 mm or more and 1.5 mm or less.

The restricting member 16 has an L-shaped cross section in a direction perpendicular to the circumferential direction. The restricting member 16 has a side portion 16a contacting a peripheral side surface of the positive electrode 4, and a facing portion 16b contacting a surface of the positive electrode 4 that faces the bottom 1a of the case 1. The facing portion 16b is in contact with the bottom 1a of the case 1.

For example, in the case where the battery 10A is a primary battery, when the positive electrode 4 swells in the last stage of discharge, the restricting member 16 restricts the shape of the positive electrode 4 with the side portion 16a by suppressing radial expansion of the positive electrode 4 and thereby increasing the thickness thereof. This enables to maintain the contact pressure between the positive electrode 4 and the current collector 7 at a desired pressure or more throughout the life of the battery 10A. In that way, the discharge characteristics of the flat-shaped battery can be improved.

A modified example of the flat-shaped battery of this embodiment is partially illustrated in enlarged cross section in FIG. 7. A current collector of the modified example attached to the bottom of the case is illustrated as top view in FIG. 8. In a battery 10B of the modified example, the restricting member 16 is not in direct contact with the bottom 1a of the case 1. The restricting member 16 is in contact with a current collector 7A, aiding the electrical connection between the positive electrode 4 and the case 1. More specifically, in the modified example, the current collector 7A has an extended length (when the current collector is rectangular or the like) or diameter (when circular or the like) so as to come in contact with the facing portion 16b of the restricting member 16. The current collector 7A and the positive electrode 4, as a result, have a clearance therebetween corresponding to the thickness of the facing portion 16b.

In the battery 10B, the current collector 7A is therefore provided with a protrusion protruding toward the positive electrode 4. This allows the current collector 7A and the positive electrode 4 to be kept in good contact with each other. More specifically, the current collector 7A includes a primary current collector 18 and a secondary current collector 20. The primary current collector 18 is, for example, a plate-shaped member having the same size and shape as those of the current collector 7 of Embodiment 1. The primary current collector 18 is not welded to the case 1 within the center portion AR1 of the bottom 1a, and is welded to the case 1 within the outside region AR2 of the bottom 1a. Welding marks 14 thereof are shown in FIG. 8. The secondary current collector 20 is a plate-shaped member having a smaller size than the primary current collector 18. The secondary current collector 20 is disposed between the primary current collector 18 and the positive electrode 4, and welded to a center portion of the primary current collector 18 (not shown). The secondary current collector 20 constitutes the above protrusion. Providing the current collector with a protrusion protruding toward the positive electrode can realize more favorable contact between the current collector and the positive electrode, and can improve the discharge characteristics of the flat-shaped battery more reliably. Even in a configuration without a restricting member as in Embodiment 1, the current collector preferably includes a secondary current collector (protrusion), because this can increase the contact pressure between the current collector and the positive electrode.

Examples of the present invention will now be described. The following examples are for illustrative purpose only, and not intended to limit the technical scope of the present invention.

EXAMPLE 1

Production of Positive Electrode

First, 100 parts by mass of manganese dioxide heat-treated at 450° C. (positive electrode active material) and 10 parts by mass of graphite (conductive material) were dry-mixed. Subsequently, 5 parts by mass of polytetrafluoroethylene (binder) was added to the resultant dry mixture, and kneaded together. The resultant kneaded material was dried and pulverized into a powdery positive electrode material mixture. The positive electrode material mixture was packed into a cylindrical die of 14.0 mm in diameter, and pressed, to from a pellet-shaped positive electrode material mixture.
(Production of Negative Electrode)

A lithium metal foil having a thickness 1.0 mm was punched in a circle of 15 mm in diameter, which was used as a negative electrode. The lithium metal foil was pressure-bonded onto the inner surface of a sealing plate.
(Separator and Non-Aqueous Electrolyte)

Polypropylene non-woven fabric having a thickness of 100 μm was punched in a circle (diameter: 20 mm), and shaped like a cup, which was used as a separator. A non-aqueous electrolyte was prepared by dissolving lithium perchlorate at a concentration of 1 mol/L in a mixed solvent containing propylene carbonate (PC) and 1,2-dimethoxyethane (DME) in a volume ratio of 5:5.

(Fabrication of Battery)

A rectangular stainless steel plate having a size of 14 mm long, 5 mm wide and 0.1 mm thick was placed as a current collector on the inner surface of the bottom of a stainless steel case (diameter: 20 mm) having an average thickness of 0.25 mm. The current collector was disposed such that the center portion thereof overlaps the center (axial center) of the bottom of the case. The current collector was spot-welded to the bottom so as to form two welded portions each at two point-symmetric positions at 4.5 mm away from the center of the bottom. The bottom of the case used at this time was concaved inward (lifted amount H1=0.1 mm) so that the inclination ($\theta 1$) of the welding mark became 0.5 to 10° upon completion of the battery fabrication.

Next, the positive electrode was placed on the current collector, and the separator was placed on the positive electrode. The non-aqueous electrolyte was then injected in an amount of 300 mg into the case, to impregnate the electrolyte into the positive electrode and the separator. Subsequently, the sealing plate (diameter: 16 mm), with the lithium metal foil negative electrode pressure-bonded thereto and a gasket attached thereto at the peripheral portion thereof, was mounted on the case such that the positive electrode and the negative electrode faced each other with the separator interposed therebetween. The opening of the case was crimped inward, thereby to secure the sealing plate at the opening of the case.

In the manner as described above, a flat-shaped battery (Example battery 1) having a diameter of 20 mm and a thickness of 3.2 mm, and having a rated output voltage of 3 V was obtained. The above fabrication was carried out in a dry air having a dew point of −40° C. or less.

EXAMPLE 2

A flat-shaped battery (Example battery 2) was obtained in the same manner as in Example 1, except that the welded portions were formed at point-symmetric positions at 5.5 mm away from the center of the case bottom.

EXAMPLE 3

A flat-shaped battery (Example battery 3) was obtained in the same manner as in Example 1, except that the welded portions were formed at point-symmetric positions at 6.5 mm away from the center of the case.

EXAMPLE 4

A flat-shaped battery (Example battery 4) was obtained in the same manner as in Example 1, except that the diameter of the case was changed to 16 mm, the size of the current collector was changed to 11 mm×5 mm×0.1 mm, the current collector was spot-welded to the bottom so as to form welded portions at two point-symmetric positions at 5 mm away from the center of the case bottom, the diameter of the positive electrode material mixture pellet was changed to 11 mm, the non-aqueous electrolyte was injected into the case in an amount of 230 mg, and the diameter of the sealing plate was changed to 12.5 mm.

EXAMPLE 5

A flat-shaped battery (Example battery 5) was obtained in the same manner as in Example 1, except that the shape of the current collector was changed to a circle (diameter: 13.5 mm, thickness: 0.1 mm).

COMPARATIVE EXAMPLE 1

A flat-shaped battery (Comparative Example battery 1) was obtained in the same manner as in Example 1, except that the welded portions were formed at point-symmetric positions at 1.5 mm away from the center of the case bottom.

Ten batteries each were produced for Examples batteries 1 to 5 and Comparative Example battery 1, and subjected to 300 cycles of heating and cooling under the following conditions.

Temperature range: 100° C. to −40° C.

Heating time and cooling time in 1 cycle: 30 min each

After the 300 cycles of heating and cooling, the batteries were subjected to a 1-second pulse discharge at a discharge temperature of 100° C. and a discharge current of 10 mA, to measure a discharge voltage of ten batteries. The results showed that in Examples batteries 1 to 5, all of the ten batteries exhibited a voltage above 3 V, whereas in Comparative Example battery 1, all of the ten batteries showed a voltage below 3 V, among which the lowest was below 2 V. Furthermore, after the 300 cycles, high-temperature computed tomography (CT) was performed under the condition of 100° C., to observe a cross section of all ten batteries of Examples batteries 1 to 5 and Comparative Example battery 1. In Example batteries 1 to 5, in all of them, the current collector and the positive electrode were kept in good contact with each other, without a gap therebetween. In contrast, in Comparative Example battery 1, in all of them, the current collector and the positive electrode had a gap therebetween.

The foregoing confirmed that, by applying the present invention, the discharge characteristics of flat-shaped batteries can be improved. Such effect can be obtained when the battery has a different size and when the current collector has a different shape other than a rectangle.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the present invention, even when a flat-shaped battery is used at high temperatures or other extreme conditions and the battery internal pressure rises, the contact between the components within the battery can be maintained favorably, and the deterioration in discharge characteristics of the battery can be prevented. The present invention can therefore provide a highly reliable flat-shaped battery and is industrially usable.

REFERENCE SIGNS LIST

1: Case, AR1: Center portion, 10, 10A, 10B: Battery, 12: Welded portion, 14: Welding mark, 16: Restricting member, 1a: Bottom, 1b: Opening, 1c: Side wall, AR2: Outside region, 2: Sealing plate, 4: Positive electrode, 5: Negative electrode, 6: Separator, 7, 7A: Current collector

The invention claimed is:

1. A flat-shaped battery comprising:
   a power generation element including a positive electrode, a negative electrode, a separator, and an electrolyte;
   a cylindrical case formed of a conductor and housing the power generation element, the case having a circular bottom and a circular opening;
   a sealing plate formed of a conductor and closing the opening;
   an insulating member interposed between the case and the sealing plate; and
   a plate-shaped current collector disposed between the case and the positive electrode, the current collector being welded to the case and in contact with the positive electrode,
   wherein a welding point where the current collector is welded to the bottom is set so as to allow contact between the positive electrode and a center portion of the current collector to be maintained when the case is deformed such that a center portion of the bottom is displaced outward of the case,
   the center portion of the bottom corresponds to a region where a distance from an axial center of the bottom is 0% or more and less than 45% of a radius of the bottom,
   the welding point comprises two or more welding points set in an outside region where the distance from the axial center of the bottom is 45% or more and 100% or less of the radius of the bottom, and
   a welding mark at a welded portion between the current collector and the bottom extends from an inner surface to an outer surface of the bottom so as to be inclined with respect to a thickness direction of the bottom toward radially outside of the bottom.

2. The flat-shaped battery according to claim 1, wherein the current collector includes a protrusion protruding toward the positive electrode.

3. The flat-shaped battery according to claim 2, wherein the positive electrode is columnar in shape, with one of bottom surfaces facing the current collector, and
   the battery further comprising a ring-shaped restricting member formed of a conductor, the restricting member disposed in contact with a peripheral surface of the positive electrode adjacent to the one of bottom surfaces and serving to restrict radial expansion of the positive electrode.

4. The flat-shaped battery according to claim 3, wherein the restricting member and the current collector are in contact with each other.

5. The flat-shaped battery according to claim 2, wherein the current collector includes a primary current collector, and a secondary current collector disposed between the primary current collector and the positive electrode, and
   the secondary current collector constitutes the protrusion.

6. The flat-shaped battery according to claim 5, wherein the secondary current collector is welded to the primary current collector, and
   the main current collector is welded to the bottom at the welding point.

7. The flat-shaped battery according to claim 1, wherein the current collector is disposed such that the center portion thereof is in contact with the positive electrode, and the current collector is disposed so as to face at least the center portion of the bottom of the case.

\* \* \* \* \*